United States Patent [19]

Makowski et al.

[11] 4,184,988
[45] Jan. 22, 1980

[54] PROCESS FOR THE SULFONATION OF AN ELASTOMERIC POLYMER

[75] Inventors: Henry S. Makowski, Scotch Plains; Robert D. Lundberg; Jan Bock, both of Bridgewater, all of N.J.

[73] Assignee: Exxon Research & Engineering Co., Florham Park, N.J.

[21] Appl. No.: 951,394

[22] Filed: Oct. 16, 1978

Related U.S. Application Data

[63] Continuation-in-part of Ser. No. 855,701, Nov. 29, 1977, abandoned.

[51] Int. Cl.² ............................................. C08L 91/00
[52] U.S. Cl. ........................ 260/23.5 A; 260/28.5 B; 260/33.6 AQ; 260/33.6 UA; 260/33.8 UA; 260/42.33; 260/42.47; 260/DIG. 31; 525/353; 525/333
[58] Field of Search ......... 260/33.6 AQ, 33.8, 23.5 A, 260/28.5 B, 42.33, 42.47; 526/20, 40

[56] References Cited

U.S. PATENT DOCUMENTS

| | | | |
|---|---|---|---|
| 3,396,136 | 8/1968 | Dickerson | 260/30.6 R |
| 3,642,728 | 2/1972 | Canter | 260/23.7 M |
| 3,836,511 | 9/1974 | O'Farrell et al. | 260/DIG. 31 |
| 3,847,854 | 11/1974 | Canter et al. | 260/30.4 R |

*Primary Examiner*—Lewis T. Jacobs
*Attorney, Agent, or Firm*—R. E. Nanfeldt

[57] ABSTRACT

An improved process for the sulfonation of an unsaturated elastomeric polymer to form a sulfonated elastomeric polymer, wherein a cement which contains an elastomeric polymer dissolved in a nonreactive solvent is contacted with a sulfonating agent at between about −100° C. and +100° C. for a period of time sufficient to result in sulfonation of the elastomeric polymer wherein the improvement includes the use of a sulfonating agent which is formed from mixtures of acyl sulfate

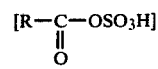

with carboxylic acid anhydrides

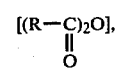

with carboxylic acid halides

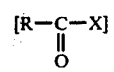

or with both, wherein R is selected from the group consisting of $CH_3-$, $C_2H_5-$, $C_3H_7-$, $C_4H_9-$, $C_5H_{11}$, $C_6H_{13}$ or $C_6H_5$ and mixtures thereof. The molar ratio of

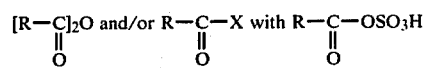

is at least one.

18 Claims, No Drawings

PROCESS FOR THE SULFONATION OF AN ELASTOMERIC POLYMER

CROSS-REFERENCE TO RELATED APPLICATION

This application is a continuation-in-part of copending application Ser. No. 855,701 filed Nov. 29, 1977 now abandoned.

FIELD OF THE INVENTION

An improved process for the sulfonation of an unsaturated elastomeric polymer to form a sulfonated elastomeric polymer, wherein a cement containing an elastomeric polymer dissolved in a nonreactive solvent is contacted with a sulfonating agent at between about $-100°$ C. and $+100°$ C. for a period of time sufficient to result in sulfonation of the elastomeric polymer, wherein the improvement includes the use of a sulfonating agent which is formed from mixtures of acyl sulfate

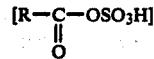

with carboxylic acid anhydrides

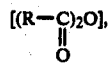

with carboxylic acid halides

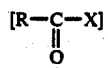

or with both, wherein R is selected from the group consisting of $CH_3-$, $C_2H_5-$, $C_3H_7-$, $C_4H_9-$, $C_5H_{11}$, $C_6H_{13}$ or $C_6H_5$ and mixtures thereof. The molar ratio of

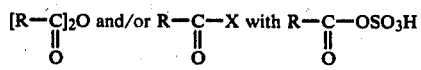

is at least one.

BACKGROUND OF THE INVENTION

Recently, a new class of thermoelastic sulfonated polymers have been described in a number of U.S. Patents, wherein these sulfonated elastomeric polymers have been produced from commercial elastomeric polymers by either sulfonating with a sulfur trioxide complexed with a Lewis base or an acyl sulfate.

The sulfonated elastomeric polymers of these patents were produced from elastomeric polymers having Mooney viscosities of about 50 to about 90 at 212° F. at (1+8) minutes. The high melt viscosities and molecular weights of the initial elastomeric polymers resulted in sulfonated elastomeric polymers having extremely high melt viscosities thereby limiting their use on conventional mixing and fabrication equipment.

Commercial hydrocarbon elastomers such as Vistalon 2504, Vistalon 3708, Vistalon 4608 and Butyl 365 contain some volatile components, most of which is water. The volatile contents depend on polymer type and Mooney viscosity but are generally not below 0.5 weight percent, more normally not below about 0.3 weight percent, and on occasion even lower. Indeed water contents of hydrocarbon polymers vary with the severity of finishing conditions and can vary widely even from bale to bale. When such wet commercial polymers are sulfonated with the reagents described in earlier patents, the incorporation of sulfur is lowered and excesses of reagents are required; however, variable water means variable sulfur levels and off-specification products. In the study of sulfonation reactions, those skilled in the art frequently dry the hydrocarbon polymer further, for example by mixing on a hot rubber mill or by air or vacuum oven drying. Water levels are also significantly reduced by hot extrusion of the commercial polymers, an operation designed to lower the molecular weight and the viscosity of the base polymer.

During the manufacture of elastomeric polymers, the percentage of retained water is increased as the Mooney viscosity decreases. For example, an EPDM terpolymer having a 20 Mooney viscosity at 212° F. generally contains at least 1.0 wt.% of water and could have as high as 3.0 wt.% of retained water.

The two previously taught methods of sulfonation as described in the following patents work readily on elastomeric polymers having less than 0.1 wt.% of water. However, as the percentage of retained water increases, not only does the degree of sulfonation decrease but also the undesirable side reaction of sulfation occurs as will be clearly illustrated in the main embodiment of the present instant invention.

U.S. Pat. No. 3,642,728, herein incorporated by reference, teaches a method for the selective sulfonation of olefinic unsaturation sites of an elastomeric polymer, such as Vistalon 3509 having a Mooney of 90, to form a sulfonated elastomeric polymer. The olefinic sites of the elastomeric polymer are sulfonated by means of a sulfur trioxide complexed with a Lewis base. The sulfonated elastomer can be readily neutralized with a basic material to form an ionically cross-linked elastomer having substantially improved physical properties over an unsulfonated elastomer at room temperature. However, these ionically cross-linked elastomers may be processed like a conventional thermoplastic at elevated temperatures under a shear force in the presence of selected preferential plasticizers which dissipate the ionic associations at the elevated temperatures thereby creating a reprocessable elastomer. If an EPDM contains no moisture and no reagent consuming materials, such as calcium stearate slurry aid used in the plant isolation of the EPDM, the $SO_3$ complexes will be converted essentially quantitatively to sulfonated polymer.

If an EPDM terpolymer containing 5-ethylidene-2-norbornene as the third monomer having a Mooney viscosity of 20 and more than 0.2 wt.% water is sulfonated with 30 mmoles of reagent per 100 g of EPDM according to this method, the conversion of the $SO_3$ complex to sulfonate and sulfate is less than 65 percent due to the reaction of the water with the complex to generate sulfuric acid and free Lewis base.

The sulfuric acid may react with the unsaturation sites of the elastomeric polymer to result in the production of hydrolytically and thermally unstable sulfates rather than the desired sulfonates. This is the case when 5-ethylidene-2-norbornene is the third monomer in the EPDM. With less highly substituted olefins the sulfuric acid is relatively unreactive to the available unsaturation and does not take part in further reactions.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the sulfonated elastomeric polymers are organic amines. This patent clearly teaches that the acyl sulfate is generated at a molar ratio of acid anhydride to sulfuric acid of 1.4:1 or less. This sulfonating agent works readily on the elastomeric polymers embodied by this patent, namely Vistalon 4608, if these polymers contain less than 0.1 weight percent retained water; and Butyl rubber 268 having a 55 Mooney and less than 0.1 weight percent retained water. When an EPDM terpolymer having a 20 Mooney and more than 0.5 weight percent water (see Table III, Sample F) of the present invention is sulfonated at a molar ratio of acetic anhydride to sulfuric acid of 1.6 or less, a conversion of sulfonating agent to sulfonated elastomeric polymer of less than about 50 percent is realized. The water reacts with the generated sulfonating agent to yield acetic acid and sulfuric acid, neither of which is a sulfonating agent. The reaction rate of water with the sulfonating agent is virtually instantaneous [J. Russell and A. E. Cameron, *J. Amer. Chem. Soc.*, 60, 1345 (1938)]. Acetic anhydride on the other hand reacts slowly with water to form acetic acid ["Techniques of Chemistry, Volume II Organic Solvents", 3rd Edition, J. A. Riddick and W. B. Bunger, Wiley-Interscience, New York, 1970, p. 743].

$$(CH_3C)_2O + H_2SO_4 \longrightarrow CH_3C\text{—}OSO_3H + CH_3COH$$
$$\phantom{(CH_3C)_2O}\ \ \ \ \phantom{+ H_2SO_4 \longrightarrow}\ \ \ \ \ \ \ \ \ \ \ \|\phantom{C\text{—}OSO_3H}\ \ \ \|$$
$$\phantom{(CH_3C)_2O + H_2SO_4 \longrightarrow CH_3}\ \ O\phantom{C\text{—}OSO_3H + CH_3}\ O$$

$$CH_3C\text{—}OSO_3H + H_2O \longrightarrow H_2SO_4 + CH_3COH$$

U.S. Pat. Nos. 3,779,974; 3,770,682; and 3,912,605 herein incorporated by reference, teach the process method of U.S. Pat. No. 3,836,511, wherein a Butyl rubber having a 55–60 Mooney is sulfonated.

The present invention is concerned with the use of improved sulfonating agents and a process for the sulfonation of an elastomeric polymer having more than 0.2 wt.% water to produce a sulfonated elastomeric polymer, wherein at least 70% of the amount of sulfonating agent present in the reaction zone that does not exceed the stoichiometric amount of sulfonating agent required to react with all available unsaturation in the elastomeric polymer is converted to sulfonate groups in the elastomeric polymer. More preferably the conversion is at least 80% and most preferably 85%, wherein the molar ratio of the sulfonating agent to available unsaturation sites in the polymer is 1.0 or less.

SUMMARY OF THE INVENTION

It has been surprisingly found that the sulfonating agents can be used to sulfonate elastomeric polymers having more than 0.2 wt.% water to conversion levels, based on the conversion of sulfonating agent to incorporated sulfur in the sulfonated elastomeric polymer, of more than about 70 percent; more preferably more than about 80 percent; and most preferably more than about 85 percent.

The present invention describes an improved process for the sulfonation of elastomeric polymers having more than 0.2 wt.% water to a conversion level, based on the conversion of sulfonating agent to incorporated sulfur in the sulfonated elastomeric polymer, of at least about 70 percent; more preferably at least about 80 percent; and most preferably at least about 85 percent, wherein the % conversion is based upon the sulfonating agent being present in the stoichiometric amounts to the amount of available unsaturation in the elastomeric polymer; that is, the molar ratio of sulfonating agent to available unsaturation sites in the elastomeric polymer is 1.0 or below.

The present invention describes improved sulfonation agents for the improved sulfonation process, wherein the improved sulfonation agents

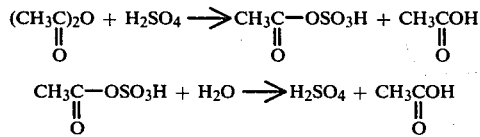

are formed from mixtures of sulfuric acid and an acid anhydride (Method I) with an acid halide (Method II) or with both (Method III) and from mixtures of halosulfonic with acid anhydride or with acid anhydride and acid halide (Method IV). The molar ratios of acid anhydride and/or acid halide in I, II and III is at least about 2.0 while the molar ratio of acid anhydride to halosulfonic acid in IV is at least about 1.0.

GENERAL DESCRIPTION OF THE INVENTION

The present invention relates to an improved process for the sulfonation of elastomeric polymers. The process of the present invention is particularly attractive for the sulfonation of elastomers that contain more than about 0.2 wt.% water.

The improved sulfonation agent combination can be formed by simply mixing the constituents together or generated through the reaction of various other reagents. Exemplary systems for generating the reagents are described below.

I. Sulfuric Acid and Carboxylic Acid Anhydride

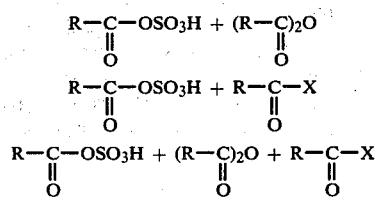

II. Sulfuric Acid and Acyl Halide

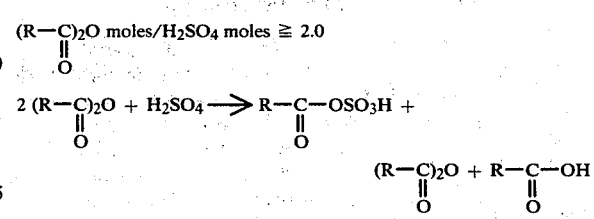

In these instances any acyl sulfate which decomposes to sulfuric acid through co-reaction with water

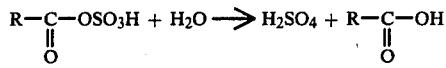

is quickly regenerated through the reaction of the newly formed sulfuric acid with excess carboxylic acid anhydride or excess acyl halide. Since the acid anhydride and acyl halide are equally effective in eliminating water and maintaining reagent strength, then mixtures of the two can be employed.

III. Sulfuric Acid, Carboxylic Acid Anhydride, and Acyl Halide

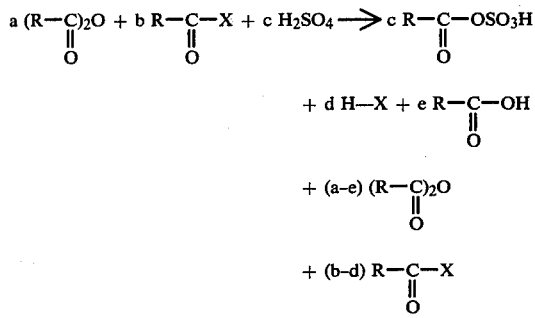

Another especially desirable alternate sulfonation agent to be used with elastomeric polymers having more than 0.2 wt.% water is a mixture of acid anhydride and halo sulfonic acid.

IV. Halosulfonic Acid and Carboxylic Acid Anhydride

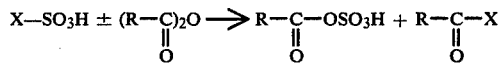

When the reagent acyl sulfate is generated from halosulfonic acid and carboxylic acid anhydride, a by-product acyl halide is formed. When water impurity reacts with the acyl sulfate to form sulfuric acid and carboxylic acid, the acyl halide co-reacts with the sulfuric acid to regenerate acyl sulfate as described under Method II.

It is possible in the generation of reagents according to Methods I, II and III to form the reagents and effect the process in the following different ways:

A. Preform reagent from sulfuric acid and desired excess of acid anhydride or acyl halide.

B. Preform reagent from sulfuric acid and sufficient acid anhydride or acyl halide. Add excess acid anhydride or acyl halide to the polymer cement prior to reagent addition.

C. Prepare reagent in situ by addition of excess acid anhydride or acyl halide to the polymer cement followed by slow addition of sulfuric acid.

Reagent from Method IV cannot be generated in situ in the case of unsaturated polymers since the reaction of halosulfonic acid with polymer unsaturation is extremely rapid so that reaction with acid anhydride hardly occurs and a gelled polymer mass results. However, reagent from Method IV can be pre-regenerated and used according to Methods A and B.

The carboxylic acid anhydrides and acyl halides are derived from carboxylic acids having a solubility of at least about 0.2 grams/100 ml. of water at 25° C. Typical carboxylic acid anhydrides and acyl halides are selected from the group consisting of acetic acid, propionic acid, butyric acid, valeric acid, caproic acid, or benzoic acid and mixtures thereof. The preferred carboxylic acid anhydride is acetic anhydride because of its low molecular weight, availability and effectiveness.

The acyl halides are selected from the group consisting of acyl fluoride, acyl chloride, and acyl bromide, preferably the acyl chloride. Just as with the carboxylic acid anhydride, the preferred acyl chloride is acetyl chloride because of its low molecular weight, its availability and its effectiveness. In the generation of acetyl sulfate from $H_2SO_4$ and these reagents, the molar ratio of the acetic anhydride or acetyl chloride to the concentrated sulfuric acid is at least about 2.

Therefore, the sulfonating agent of the present invention can be generally defined as a mixture of a carboxylic acid anhydride or an acyl halide or both with a sulfonation agent $RCO_2SO_3H$ wherein the molar ratio of acid anhydride or acyl halide or both to $RCO_2SO_3H$ is at least about 1 and at least 70% of the amount of sulfonating agent present in the reaction zone that does not exceed the stoichiometric amount of sulfonating agent required to react with all the available sites of unsaturation in the elastomeric polymer is converted to sulfonate groups on said elastomeric polymer; more preferably the conversion is at least 80%, and most preferably the conversion is at least 85%, wherein the molar ratio of sulfonating agent to available unsaturation sites in the elastomeric polymer is 1.0 or less.

The % conversion, or conversion level, is based on the conversion of the reagent to sulfur-containing groups incorporated within the sulfonated polymers. Sulfonate groups are those groups containing the $SO_3$ moiety connected through the sulfur atom to a carbon atom.

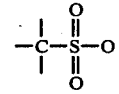

The sulfonate group introduced via sulfonation is typically a sulfonic acid

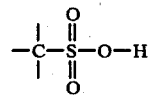

or other sulfonate precursor group depending upon the olefinic structure to be sulfonated. These compounds are generally easily reacted with metallic bases to the corresponding metal sulfonates

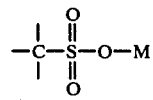

During titration of sulfonated polymers with sodium hydroxide, or other metallic bases, the sulfonate compounds consume 1 equivalent of sodium hydroxide.

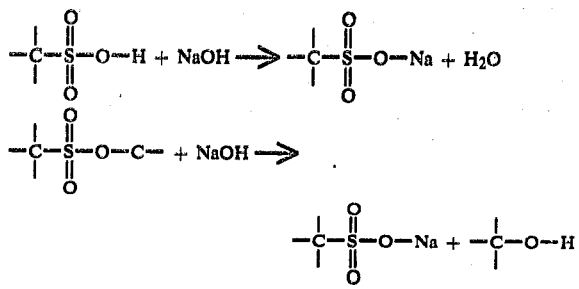

Sulfate groups are those groups containing the SO₄ moiety connected to a carbon atom within the polymer through one of the oxygen atoms

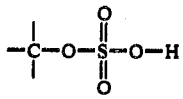

During titration of sulfonated polymers with bases such as sodium hydroxide sulfates consume two equivalents of base per sulfate group of per mole of sulfur

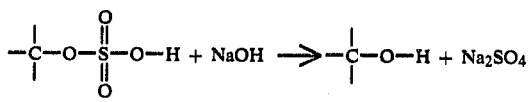

to produce a neutral alcohol and sodium sulfate.

Sulfonated polymers can be readily analyzed for their sulfur contents through procedures such as the Dietert method and and Paar method. When the sulfur content determined from sulfur analysis corresponds on a molar basis to the equivalents of base consumed during titration all of the combined sulfur is in sulfonate form. However, if the equivalents of base consumed during titration exceeds that of the molar sulfur content, then at least some of the combined sulfur is in sulfate form. When all of the sulfur is in sulfate form, then the equivalents of base is exactly twice that of the molar sulfur content.

When sulfation occurs in the absence of sulfonation, the sulfation reaction is a very low-yield reaction (based on the conversion of the original sulfonating agent to sulfur containing groups within the polymer). Consequently, high-yield sulfonation reactions can be considered to result in little, if any, sulfation.

The sulfonation agent is an acyl sulfate, $RCOOSO_3H$, which is derived from $SO_3$, $H_2SO_4$, or $ClSO_3H$ by reaction with carboxylic acids, carboxylic acid halides, or carboxylic acid anhydrides. The most useful reagents are derived from acetic acid and its derivatives. Acetic acid, acetyl halides, and acetic anhydride are used in excess over the sulfur containing $SO_3$, $H_2SO_4$ and $ClSO_3H$. The reactions of these sulfur oxide derivatives with acetic acid, acetic anhydride and acetyl halides to acetyl sulfate are very high-yield reactions and are considered to be quantitative. Thus the molar amount of acetyl sulfate is identical to the molar amounts of $SO_3$, $H_2SO_4$, $ClSO_3H$ which are used to generate the acetyl sulfate sulfonating agent. Since conversion of the sulfonation reaction is based on the acyl sulfate, and the acyl sulfate concentration is directly determined from the concentrations of the starting sulfur oxide derivatives, then the conversion of the sulfonation reaction is based on the starting $SO_3$, $H_2SO_4$ or $ClSO_3H$.

The acyl sulfate reacts with the elastomeric polymers of this invention through unsaturation sites of the elastomeric polymer and not through the saturated backbone. Thus, the achievable sulfonate content is limited by the amount of available unsaturation in the elastomeric polymer. For example, if the polymer contains 20 mmoles of unsaturation per 100 grams of polymer, then it will be possible to introduce only about 20 mmoles of sulfonate groups per 100 grams of polymer. If higher sulfonate contents are desired, then the starting polymer must contain at least as much unsaturation.

It should be obvious to those skilled in the art that when an excess sulfonating agent is added on a molar basis to an unsaturated polymer, the conversion of sulfonating agent to sulfur-containing groups can never be 100%. For example, when two moles of sulfonating agent are added per mole of available unsaturation, a maximum conversion of only 50% is possible. It is certainly within the scope of this invention to use excesses of reagent and obtain reduced conversions of sulfonating agent. However, this is both unnecessary and undesirable. Of course, reagent cost increases, and in some instances some undesirable side reactions can occur with excess reagent present. In addition, the subsequent neutralization of the sulfonation mixture becomes more complicated and costly due to the larger quantities of base required for full neutralization of the sulfonation mixture.

For the invention described herein, conversion of the reagent has been determined under conditions where the molar ratio of sulfonating agent to available unsaturation is 1.0 or below. If, for example, the polymer contains 50 mmoles of unsaturation per 100 grams of polymer, no more than 50 mmoles of reagent can be used to determine reagent conversion. Generally it is desirable to use less than one mole of reagent per mole of available unsaturation to achieve the sulfonate levels which produce desirable changes in polymer properties. Although higher levels of sulfonating agent can be used for the process of introducing sulfonate groups, the efficiency of the sulfonation reaction cannot be determined under these conditions.

The amount of desirable sulfonation depends on the particular application. Preferably, the elastomeric polymer is sulfonated at about 10 to about 100 meq. sulfonate groups/100 g of polymer, more preferably at about 10 to about 50 meq. sulfonate groups/100 g of polymer, and most preferably at about 20 to about 40 meq. sulfonate groups/100 g of polymer. The sulfonate content of the polymer is determined by both titration of the sulfonate groups and Dietert sulfur analysis. In the titration of the sulfonate groups, the polymer is dissolved in solvent consisting of 95 parts of toluene and 5 parts of methanol at a concentration level of 50 grams per liter of solvent. The polymeric sulfonate is titrated with ethanolic sodium hydroxide to an Alizarian Thymolphthalein end point.

The elastomeric polymers of the present invention which are sulfonated by the aforementioned sulfonating agents are derived from synthetic and natural polymers having olefinic unsaturation sites through which sulfonation occurs, wherein the polymer has from about 0.1 to about 5.0 mole percent olefinic unsaturation. The unsaturation sites can be in the polymer backbone, pendant therefrom or cyclic, except that aromatic containing polymers are excluded from this description. In particular, the unsaturated polymers of this present invention include low unsaturated elastomeric polymers such as Butyl rubber, or EPDM terpolymers. Alternatively, other unsaturated polymers are selected from the group consisting of partially hydrogenated polyisoprenes, partially hydrogenated polybutadienes, neoprene, styrene-butadiene copolymers and isoprene-styrene random copolymers. Highly unsaturated elastomers other than neoprene, such as polybutadiene, would be contemplated in this invention in terms of pacifying the water contained in the sulfonation cement. However, such high unsaturation polymers gel with the reagents of this invention and useless products result.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin. Butyl rubber generally has a Staudinger molecular weight of about 20,000 to about 500,000, preferably about 25,000 to about 400,000 especially about 100,000 to about 400,000, and a Wijs Iodine No. of about 0.5 to 50, preferably 1 to 15. The preparation of Butyl rubber is described in U.S. Pat. No. 2,356,128 which is incorporated herein by reference. For the purposes of this invention, the Butyl rubber may have incorporated therein from about 0.2 to 10% of combined multiolefin, preferably about 0.5 to about 6%, more preferably about 1 to about 4%, e.g. 2%. Illustrative of such a Butyl rubber is Exxon Butyl 268 (Exxon Chemical Co.), having a mole percent unsaturation of about 2.0% and a Mooney viscosity (ML, 1+3, 260° F.) of about 50-60.

Low molecular weight Butyl rubbers, i.e. Butyl rubbers, having a viscosity average molecular weight of about 5,000 to 85,000 and a mole percent unsaturation of about 3 to about 4% may be sulfonated by the process of this invention. Preferably, these polymers have a viscosity average molecular weight of about 25,000 to about 60,000.

The term "EPDM" is used in the sense of its definition as found in ASTM-D-1418-64 and is intended to mean a terpolymer containing ethylene and propylene in the backbone and a diene in a side chain. Illustrative methods for producing these terpolymers are found in U.S. Pat. No. 3,280,082, British Pat. No. 1,030,289 and French Pat. No. 1,386,600, which are incorporated herein by reference. The preferred terpolymers contain about 40 to about 75 wt.% ethylene and about 1 to about 10 wt.% of a diene monomer, the balance of the polymer being propylene. Preferably, the polymer contains about 45 to about 70 wt.% ethylene, e.g. 50 wt.% and about 2.6 to about 9.0 wt.% diene monomer, e.g. 5.0 wt.%. The diene monomer is preferably a nonconjugated diene. The $\overline{M}n$ as measured by GPC of the terpolymer is preferably about 10,000 to about 200,000; more preferably about 15,000 to about 100,000; and most preferably about 20,000 to about 60,000. The Mooney viscosity (ML, 1+8) of the terpolymer at 212° F. is preferably 5 to 60, more preferably 10 to 50 and most preferably 15 to 40, e.g. 20. The $\overline{M}v$ as measured by GPC of the EPDM is preferably below about 350,000 and more preferably below about 300,000; e.g. 270,000.

The $\overline{M}w$ as measured by GPC of the EPDM is preferably below about 500,000 and more preferably below about 350,000, e.g. 343,000.

Illustrative of nonconjugated diene monomers which may be used in the EPDM are 1,4-hexadiene, dicyclopentadiene, 5-ethylidene-2-norbornene, 5-methylene-2-norbornene, 5-propenyl-2-norbornene and methyl tetrahydroindene. A typical EPDM is Vistalon 2504 (Exxon Chemical Co.), a terpolymer having a Mooney viscosity at 212° F. of about 40, and having 50 wt.% of ethylene, 45 wt.% of propylene and 5.0 wt.% of 5-ethylidene-2-norbornene. Vistalon 3708 (Exxon Chemical Co.) is a terpolymer having a Mooney viscosity at 260° F. of about 45-55 and having about 64 wt.% of ethylene, about 3.3 wt.% of 5-ethylidene-2-norbornene and about 32.7 wt.% propylene. Vistalon 6505 (Exxon Chemical Co.) is a terpolymer having a Mooney viscosity at 260° F. of about 45-55 and having about 53 wt.% of ethylene, about 9.0 wt.% of 5-ethylidene-2-norbornene, and about 38 wt.% of propylene. Nordel 1320 (DuPont) is another EPDM terpolymer having a Mooney viscosity at 212° F. of about 25 and having about 53 wt.% of ethylene, about 3.5 wt.% of 1,4-hexadiene, and about 43.5 wt.% of propylene. The aforementioned elastomeric polymers can be broken down through a combination of shear and heat such as in an extruder to form lower molecular species having lower Mooney viscosities. For example, Vistalon 2504 can be reprocessed through an extruder to a Mooney viscosity at 212° F. of 20 with an $\overline{M}n$ as measured by GPC of about 26,000 and an $\overline{M}w$ as measured by GPC of about 125,000, wherein the reprocessed Vistalon 2504 is designated as Vistalon 2504-20.

In carrying out the sulfonation process of the present invention, a cement containing an olefinically unsaturated elastomeric polymer dissolved in a solvent to form a cement is contacted with a sulfonating agent wherein the solvent is nonreactive to the sulfonating agent and to the unsaturated elastomeric polymer. The solvent is preferably a chlorinated aromatic hydrocarbon, an aliphatic hydrocarbon, an alicyclic hydrocarbon or a chlorinated aliphatic hydrocarbon. Illustrations of these solvents are: isopentane, n-pentane, cyclohexane, isohexane, n-hexane, heptane, 1,2-dichloroethane, methylene chloride, or chlorobenzene and mixtures thereof. The concentration of the elastomeric polymer in the neutral solvent is about 2 to about 25 wt.%, more preferably about 5 to about 20; and most preferably about 10 to about 15.

The hydrocarbon cement of elastomeric polymers of the present invention has about 0.1 to about 5 wt.% of water, more preferably about 0.2 to about 4.0 and most preferably about 0.2 to about 3 based on the elastomeric polymer. The water in the cement can result from insufficient drying of the starting elastomeric polymer during manufacture or the incorporation of water in the preparation of the polymer cement prior to sulfonation. Water in the polymer cement derived from any part of the manufacturing process, e.g. wet solvent, or insufficient drying of the sulfonating kettle is just as damaging as water contained in wet starting polymer.

Sulfonation of the elastomeric polymer is conducted by contacting the sulfonating agent with the cement of the elastomeric polymer in the reaction zone at a temperature between −100° to +100° C., wherein the reaction time is about 1 to about 60 minutes, more preferably about 5 to about 45 minutes and most preferably about 15 to about 30. The sulfonation of less substituted olefinic structures, such as derived from 1,4-hexadiene terpolymers, requires somewhat higher temperatures, e.g. 50° C., when unsaturation levels are low, e.g. less than 2 mole %. More highly substituted olefinic structures, such as that derived from 5-ethylidene-2-norbornene, are rapidly sulfonated at room temperature and below even at low levels of unsaturation. The sulfonated elastomeric polymer is soluble in the solvent of the cement. The sulfonation reaction is quenched with an aliphatic alcohol such as methanol, ethanol, isopropanol, benzyl alcohol, a cycloaliphatic alcohol, such as cyclohexanol, or an aromatic hydroxyl compound such as phenol.

The sulfonating species of the present invention is $RCOO-SO_3H$, wherein R can be selected from the group consisting essentially of $CH_3$, $C_2H_5$, $C_3H_7$, $C_4H_9$, $C_5H_{11}$, $C_6H_{13}$ or $C_6H_5$. The sulfonating species can be formed from a plurality of various chemical reactions as illustrated in the following equations:

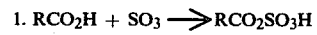

1. $RCO_2H + SO_3 \longrightarrow RCO_2SO_3H$

2. $(RCO)_2O + H_2SO_4 \longrightarrow RCO_2SO_3H + RCO_2H$

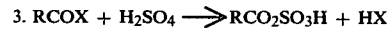

3. $RCOX + H_2SO_4 \longrightarrow RCO_2SO_3H + HX$

4. $RCO_2H + XSO_3H \longrightarrow RCO_2SO_3H + HX$

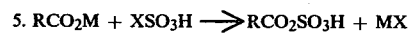

5. $RCO_2M + XSO_3H \longrightarrow RCO_2SO_3H + MX$

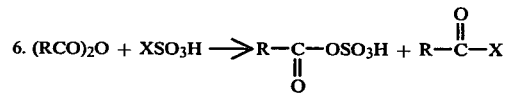

6. $(RCO)_2O + XSO_3H \longrightarrow R-\underset{\underset{O}{\|}}{C}-OSO_3H + R-\underset{\underset{O}{\|}}{C}-X$ wherein M is selected from the group consisting of sodium, potassium, lithium, and cesium and X is selected from the group consisting of fluorine, chlorine, bromine and iodine.

The more preferred acyl sulfates are those prepared according to equations 2, 3, 4 and 6, since acyl sulfates generated according to equations 1 and 5 generally require solvents for their preparation and require separate addition of acid anhydride or acid halide to the cement. Obviously, those reagents which can be prepared and used neat are more preferred.

The most preferred acyl sulfate sulfonation agents are those which can be generated from $H_2SO_4$ or $XSO_3H$ in the absence of solvents (2, 3 and 6). Although the preferred sulfonation agents can be prepared in solution with such solvents as chlorinated aliphatics, such as 1,2-chloroethane or chloroform, and aromatics, such as chlorobenzene, it is more desirable to prepare them neat. The most preferred process is the generation of the sulfonation agent in situ, i.e., by adding the acid anhydride or acid halide to the polymer cement followed by addition of sulfuric acid (2,3).

The acyl sulfate is highly reactive to water according to the following equation:

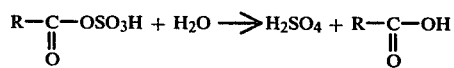

$R-\underset{\underset{O}{\|}}{C}-OSO_3H + H_2O \longrightarrow H_2SO_4 + R-\underset{\underset{O}{\|}}{C}-OH$ If the elastomeric polymer has only 0.5 wt.% of water (27.8 mmoles per 100 grams of polymer), the water can almost completely consume the

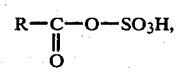

$R-\underset{\underset{O}{\|}}{C}-O-SO_3H,$ when the elastomeric polymer is to be sulfonated to a level of about 25 to about 35 mmoles of sulfonate group per 100 grams of polymer. In the sulfonation of unsaturated elastomers, the $H_2SO_4$ generated from the decomposition of the $RCO_2SO_3H$ by reaction with water is incapable of forming sulfonate groups; e.g.

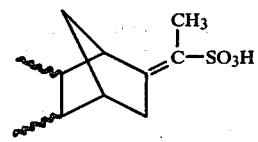

but rather forms sulfates

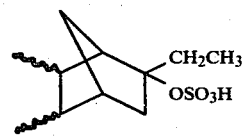

The formation of the sulfate groups is highly undesirable. Thermally these neutralized sulfate groups are less stable than those of sulfonate groups. Furthermore, the sulfate groups are readily hydrolyzed whereas the desired sulfonates are hydrolytically stable and additionally gel-free. Gel-free means that the sulfonated polymer contains less than about 5 wt.% gel, more preferably less than about 3, and most preferably less than about 1% gel as measured by stirring a given weight of polymer in a solvent comprised of 95 toluene-5-methanol at a concentration of 5 wt.%, for 24 hours, allowing the mixture to settle, withdrawing a weighed sample of the supernatant solution and evaporating to dryness.

Hydrolytically stable means that the incorporated sulfur-containing group will not be eliminated under neutral or slightly basic conditions to a neutral moiety which is incapable of being converted to a highly ionic functionality. When the sulfate hydrolyzes, the polymer functionality is reduced to an alcohol which has no ionic properties and all coulombic attractions are lost. Therefore, during the sulfonation reaction of unsaturated elastomers containing highly substituted unsaturation, it is necessary to minimize the adverse effect of water. Most often, the water is present in the elastomeric polymer to be sulfonated, wherein the elastomeric polymer has not been thoroughly dried, i.e. the elastomeric polymer contains more than about 0.2 wt.% water. Most all commercial elastomers are isolated through "steam stripping", a process where the polymer cement is added to hot water and the hydrocarbon solvent is flashed off leaving a water-wet polymer crumb. The crumb is generally dewatered and dried in suitable designed extruders. Extremely low molecular weight polymers, which are especially desirable for the preparation of thermoelastic materials through sulfonation, are very difficult to dry and frequently contain more water than their higher molecular weight counterparts. And so it is difficult to reproducibly sulfonate such wet polymers unless accurate water analyses are available for each batch of polymer to be sulfonated. Since water levels are frequently quite variable, it becomes impractical to analyze or even rely on what analyses are obtained. According to this invention, even wet polymer cements can easily be sulfonated to quality products containing the precise number of sulfonate groups desired.

While frequently the source of water in polymer cements is the undried base polymer itself, it is possible that water can find its way to the polymer cement in other ways. For example, the solvent for preparing the polymer cement may contain water, the sulfonation kettle may not have been dried after cleaning, and leaking water or steam lines may result in a wet sulfonation cement.

Polymers containing unsaturation and unneutralized sulfonate groups have been found to be somewhat deficient in thermostability. Therefore, it is desirable to neutralize a substantial portion of the sulfonate groups as part of the manufacturing of sulfonated elastomeric polymer. In addition, neutralization is required to fully develop the physical properties of the sulfonated polymer. In preparing the ionomer, it is desirable to neutralize essentially every sulfonate group. However, lower degrees of neutralization, e.g. 95%, are useful in the practice of this invention.

The neutralizing agents of the present invention are the oxides, hydroxides, alkoxides having about 1 to about 8 carbon atoms, or carboxylates of the metals selected from the group consisting of iron, antimony, lead and Groups IA, IIA, IB and IIB of the Periodic Table of Elements and mixtures thereof.

The carboxylate ion of the metallic salt is derived from the following carboxylic acids as illustrated in the present invention: acetic, benzoic, lauric, palmitic, myristic, decanoic, octanoic, and stearic. However, other carboxylic acids of the same generic class can be readily employed and are considered within the spirit and scope of the invention.

Examples of metal oxides useful in preparing metal sulfonates are MgO, CaO, BaO, ZnO, $Ag_2O$, $PbO_2$ and $Pb_3O_4$. Useful examples of metal hydroxides are NaOH, KOH, LiOH, $Mg(OH)_2$ and $Ba(OH)_2$.

The metal sulfonate containing polymers at the higher sulfonate levels possess extremely high melt viscosities and are thereby difficult to process. The addition of ionic group plasticizers markedly reduces melt viscosity and frequently enhances physical properties.

The preferential plasticizer is selected from the group consisting of a carboxylic acid or metal salts of these carboxylic acids, wherein the metal ion of the metal salt of the carboxylic acid is selected from the group consisting of iron, antimony, lead and Groups IA, IIA, IB and IIB of the Periodic Table of Elements and mixtures thereof. The preferential plasticizer is incorporated into the neutralized sulfonated EPDM terpolymer at about 3 to about 60 parts by weight per 100 parts of the neutralized sulfonated elastomeric polymer, more preferably at about 5 to about 40, and most preferably at about 7 to about 25. The neutralizing agent and plasticizer can be the same chemical species such as a metallic salt of fatty acid in which case additional metallic salt of the fatty acid is added over what is needed for neutralization. Alternatively, other preferential plasticizers are selected from carboxylic acid esters, trialkyl phosphates, amines, or amides and mixtures thereof. The preferred plasticizers are selected from stearic acid or metallic salts of stearic acid and mixtures thereof. The resultant neutralized sulfonated elastomeric polymer with preferential plasticizer is isolated as a crumb from the solution by conventional steam stripping and filtration. The wet crumb can be dried in a dewatering extruder, in a fluid bed dryer, or on a hot two-roll mill.

The dried neutralized sulfonated elastomeric polymer can be compounded with various additives in order to modify its physical and rheological properties. These additives are selected from the group consisting of nonpolar waxes, extender oils, fillers, pigments, ionic group plasticizers, antioxidants and stabilizers, and mixtures thereof. The additive or mixture of additives is incorporated into the neutralized sulfonated elastomer at a concentration level of about 1 to about 300 parts by weight per 100 parts of a neutralized sulfonated elastomeric polymer, more preferably about 5 to about 275; most preferably about 10 to about 250.

Alternatively, the unneutralized sulfonated elastomeric polymer can be isolated as a crumb by steam stripping. The additives are compounded into the fluxed unneutralized sulfonated polymer, the neutralizing agent and plasticizer are then added, and fluxing is continued until neutralization has been effected to a level of at least about 95%. The advantage of this alternate method is that the viscosity of the unneutralized sulfonated elastomeric polymer is substantially lower than the viscosity of the neutralized sulfonated elastomeric polymer thereby facilitating better compounding with the additives to be incorporated.

The fillers employed in the present invention are selected from carbon blacks, talcs, ground calcium carbonate, water precipitated calcium carbonate, and delaminated, calcined and hydrated clays and mixtures thereof. Examples of carbon black are the furnace, channel and thermal blacks. These fillers are incorporated into the blend composition at about 10 to about 200 parts by weight per 100 parts of the neutralized sulfonated elastomeric polymer, more preferably at about 10 to about 150 parts, and most preferably at about 25 to about 150 parts.

The waxes employed in the present invention are selected from the group consisting of polyolefinics, paraffins, aromatics and naphthenics. In particular, the waxes employed in this present invention have a softening point of about 135° F. to about 220° F., more preferably about 135° F. to about 200° F., and most preferably about 150° F. to 200° F. The preferred waxes have less than 2 wt.% of polar-type compounds and an $\overline{M}n$ as measured by GPC of about 1000 to about 5000, more preferably about 1500 to 3000. The waxes contemplated for use in this present invention can be selected from the group consisting of synthetic, petroleum and natural waxes. The waxes are incorporated into the blend composition at a concentration level of about 1 to about 50 parts by weight per 100 parts of the neutralized sulfonated polymer, more preferably about 1 to 40, and most preferably about 1 to about 30.

The oils employed in the present invention are nonpolar process oils having less than about 2 wt.% polar-type compounds as measured by molecular-type clay gel analyses. These oils are selected from paraffinics ASTM Type 10B as defined in ASTM D-226-70, Aromatics ASTM Type 102 or Naphthenics ASTM Type 104A, wherein the oil has a flash point by the open cup of at least 350° F., a pour point of less than 40° F., a viscosity of about 70 to about 3000 ssu's and a number average molecular weight as measured by GPC of about 400 to about 1000, and more preferably about 300 to about 750. The preferred process oils are paraffinics. The oils are incorporated into the blend composition at about 10 to about 250 parts by weight per 100 parts of the neutralized sulfonated elastomeric polymer, more preferably at about 25 to about 150; and most preferably at about 50 to about 150.

A metallic hydroxide can be incorporated into the blend composition as a means of neutralizing any residual free carboxylic acid ionic plasticizer in the neutralized sulfonated terpolymer. The metallic hydroxide is incorporated at a concentration level of about less than 2.0 parts by weight per 100 parts of the neutralized sulfonated elastomeric polymer, wherein the metal ion of the metallic hydroxide is selected from Group IIA of the Periodic Table of Elements, e.g., barium, calcium and magnesium.

DETAILED DESCRIPTION OF THE PREFERRED EMBODIMENTS

The advantages of both the reagents and processes for the sulfonation of wet polymer cements can be more readily appreciated by reference to the following examples and tables.

EXAMPLE 1

Into 1250 ml of heptane was dissolved 100 g of an ethylenepropylene-5-ethylidene-2-norbornene copolymer, Vistalon 2504-20. The copolymer contained about 50 wt.% ethylene and about 5 wt.% ENB. It possessed a Mooney viscosity (ML, 1+8, 212° F.) of about 20. This polymer was produced through the hot extrusion breakdown of commercial 40 Mooney Vistalon 2504 and additionally had been dried on a hot rubber mill so that little water was contained in the polymer.

Acetyl sulfate was prepared as follows in the following proportions: Acetic anhydride (152.6 ml = 164.8 g = 1.62 moles) was cooled to $-30°$ C. Concentrated sulfuric acid (103.0 g = 0.998 mole) was added slowly so that temperature would not exceed 0° C. The neat reagent was about 4.84 molar. The viscous reagent was allowed to warm to 10° C., and an aliquot was taken for sulfonation.

To the polymeric cement at room temperature was added 10.3 ml. of the neat acetyl sulfate (50 mmoles). The cement developed a deep purple color, and it was stirred for 60 minutes at room temperature. Reaction was terminated by the addition of 100 ml isopropyl alcohol. Then 0.5 g of Antioxidant 2246 was added and dispersed. The acid form of the sulfonated polymer was isolated by steam stripping. The polymer was pulverized and washed in a Waring blender, and the wet crumb was dewatered and dried at about 120° F. on a two-roll rubber mill.

Five grams of the sulfonated EPDM was dissolved in 100 ml of 95 toluene-5 methanol, and the solution was titrated with 0.1 N ethanolic NaOH to an Alizarin-thymophthalein end-point. Titration of the sulfonated EPDM resulted in the consumption of 41.6 milliequivalents (meq.) of sodium hydroxide per 100 grams of sulfonated polymer. This corresponds to a reagent conversion of about 86%. Sulfur analysis on the sulfonated polymer showed it to contain 1.27 wt.% sulfur which corresponds to 39.7 meq. of sulfonate groups per 100 grams of sulfonated polymer. The correspondence of the titration data and the sulfur data is excellent.

The sulfonated polymer was mixed according to the following recipe on a cold rubber mill:
Polymer 100
Pelletex NS 75
Philblack A 75
Flexon 845 Oil 100
Magnesium Stearate 35

The magnesium stearate functions as both a neutralizing agent and plasticizer. Micropads were obtained by molding the oil-black formulation for 10 minutes at 350° F. At room temperature, the oil-black formulation had a tensile strength of 1150 psi and an elongation of 280%. At 100° C. the molded compound possessed a tensile strength of 430 psi and an elongation of 350%. The oil-black compound is easily molded, extruded, and injection molded.

This example shows that a low unsaturation rubber is easily and efficiently sulfonated with acetyl sulfate sulfonation reagent. After neutralization, the sulfonated products possess good properties, and the products are not thermally unstable.

EXAMPLE 2

The procedures of U.S. Pat. No. 3,836,511 were repeated for the sulfonation of a commercial Vistalon 2504. Some of the Vistalon 2504 was dried on a hot (300° F.) rubber mill and some was used as received.

Two neat acetyl sulfate reagents were prepared as described in Example 1 at acetic anhydride/$H_2SO_4$ ratios of 1.26 (Molarity = 5.73) and 1.39 (Molarity 5.36) as described in U.S. Pat. No. 3,836,511.

Benzene solutions were prepared by dissolving 100 g of Vistalon 2504 as received (Runs A and C) or mill dried (Runs B, D, E, F, G) in 1500 ml of benzene as described in U.S. Pat. No. 3,836,511. In three runs (E,F,G) 0.5 ml, 1.0 ml and 2.0 ml, respectively, was added to the benzene cement.

Sulfonations were effected by adding 37.5 mmoles of freshly prepared acetyl sulfate reagent to the polymer cement at room temperature for 30 minutes. Polymer workup and analysis was as described in Example 1. The results are detailed in Table I.

TABLE I

| Run | A | B | C | D | E | F | G |
|---|---|---|---|---|---|---|---|
| Vistalon 2504 | | | | | | | |
| Weight, g | 100 | 100 | 100 | 100 | 100 | 100 | 100 |
| Condition | A.R.[a] | Dried | A.R.[a] | Dried | Dried | Dried | Dried |
| Solvent | Benzene | Benzene | Benzene | Benzene | Benzene | Benzene | Benzene |
| Volume, ml | 1500 | 1500 | 1500 | 1500 | 1500 | 1500 | 1500 |
| Acetyl Sulfate | | | | | | | |
| Molarity | 5.73 | 5.73 | 5.36 | 5.36 | 5.36 | 5.36 | 5.36 |
| Acetic Anhydride/$H_2SO_4$ | 1.26 | 1.26 | 1.39 | 1.39 | 1.39 | 1.39 | 1.39 |
| Volume, ml | 6.54 | 6.54 | 7.00 | 7.00 | 7.00 | 7.00 | 7.00 |
| Mmoles | 37.5 | 37.5 | 37.5 | 37.5 | 37.5 | 37.5 | 37.5 |
| Water Added, ml | 0 | 0 | 0 | 0 | 0.5 | 1.0 | 2.0 |

TABLE I-continued

| Run | A | B | C | D | E | F | G |
|---|---|---|---|---|---|---|---|
| Mmoles Sulfonate | 0 | 0 | 0 | 0 | 27.8 | 55.5 | 111 |
| Content, meq./100g | | | | | | | |
| By titration | 20.2 | 21.2 | 18.8 | 21.0 | 14.2 | 12.4 | 9.4 |
| By sulfur analysis | 15.9 | 18.9 | 15.9 | 18.4 | 12.5 | 10.2 | 8.9 |
| Conversion, % | 43 | 51 | 43 | 50 | 34 | 27 | 24 |

$^{(a)}$A.R. = as received

When benzene cements containing 0.5, 1.0 and 2.0 wt.% water on polymer (Runs E, F, G) were sulfonated with 5.36 M acetyl sulfate reagent, the incorporation of sulfur dropped to 34, 27 and 24%, respectively.

These data show that the sulfonating agents described in U.S. Pat. No. 3,836,511 are unable to sulfonate wet benzene cements to high sulfonating agent conversion and to quality products.

EXAMPLE 3

The procedure described in Example 1 was repeated with the exception that sulfonation was carried out in situ, i.e. 7.66 ml (81 mmoles) of concentrated (95%) sulfuric acid was dripped in. The resultant polymer contained 40.0 meq. and 42.2 meq. per 100 grams by titration and by sulfur analysis, respectively. Thus the sulfonation results were identical to those in Example 1.

The oil-black formulation according to Example 1 had a tensile strength of 1170 psi and an elongation of 280% at room temperature. At 100° C. it had a tensile strength of 380 psi and an elongation of 370%. Thus, the polymers sulfonated with preformed acetyl sulfate and in situ acetyl sulfate are identical.

EXAMPLE 4

The hydrolysis product of an acyl sulfate is $H_2SO_4$ and a carboxylic acid. It is necessary to know whether the carboxylic acid possesses an undesirable effect on the course of sulfonation.

To 1000 ml of hexane was added 100 g of an ethylene-propylene-5-ethylidene-2-norbornene copolymer, Vistalon 2504-20 of Example 1 except that it had been dried more thoroughly on a rubber mill to a water content of less than 0.1 wt.%. Glacial acetic acid was added at five different levels (of Table 1). Then 5.74 ml (60.75 mmoles) of acetic anhydride was added followed by the dropwise addition of 2.10 ml (37.5 mmoles $H_2SO_4$) of concentrated sulfuric acid. After 30 minutes, the reaction was terminated through the addition of 150 ml isopropanol. A sample was steam stripped, washed in a Waring blender, and then dried on a rubber mill at about 100°–120° F. A sample was titrated as described in Example 1. Sulfur analyses were obtained. The data are summarized in Table 2.

It is quite clear from the titration values and the sulfur analyses that acetic acid had absolutely no effect on the sulfonation of EPDM.

Sulfonations in benzene solvent in the absence of added water (Runs A, B, C, D) of themselves resulted in low acetyl sulfate conversions whether the neat reagent had an acetic anhydride/$H_2SO_4$ ratio of 1.26 or 1.39. Yet these conversions were identical to that obtained in U.S. Pat. No. 3,836,511. The sulfonation of as-received Vistalon 2504 gave a 43% reagent conversion while drying of the polymer raised the conversion to 50%.

It appears that acetyl sulfate reagent reacts sufficiently with benzene to rule it out as a preferred or choice solvent.

TABLE II

EFFECT OF ACETIC ACID CONTENT ON THE SULFONATION OF 20 MOONEY V-2504

| | Acetic Acid Added | | | Sulfonate Content, meq./100g | |
|---|---|---|---|---|---|
| | Ml | g | Mmoles | Titration | Sulfur Analysis |
| A | 0 | 0 | 0 | 32.2 | 33.8 |
| B | 0.98 | 1.029 | 17.14 | 32.0 | 33.8 |
| C | 1.47 | 1.544 | 25.71 | 32.8 | 33.1 |
| D | 1.96 | 2.059 | 34.28 | 32.8 | 33.0 |
| E | 2.94 | 3.088 | 51.42 | 32.8 | 34.7 |
| F | 4.91 | 5.146 | 85.70 | 32.2 | 31.0 |

EXAMPLE 5

A solution of 100 g of Vistalon 2504-20 of Example 1 in 1000 ml of hexane was sulfonated with 5.74 ml (60.75 mmoles) of acetic anhydride and 2.10 ml (37.5 mmoles $H_2SO_4$) of concentrated sulfuric acid according to the in situ method (described in Example 2). Eight separate runs were made varying in the amount of water added to the polymer cement prior to sulfonation.

Sulfonation, termination and polymer workup were as described in earlier examples. Samples were titrated for sulfonate content and analyzed for sulfur. The results are shown in Table III.

TABLE III

| | $H_2O$ Added | | | | Sulfonate Content by Titration, Meq./100g | | Sulfur Analysis | |
|---|---|---|---|---|---|---|---|---|
| | Ml | Wt.% | Meq. | Color of Cement | | Wt. % S | Sulfonate Content, Meq./100g | |
| A | 0 | 0 | 0 | Purple | 32.8 | 1.02 | 31.9 | |
| B | 0.1 | 0.1 | 5.6 | Purple | 30.2 | 0.975 | 30.5 | |
| C | 0.3 | 0.3 | 16.7 | Purple | 29.2 | 0.855 | 26.7 | |
| D | 0.6 | 0.6 | 33.3 | Brown | 23.2 | 0.595 | 18.6 | |
| E* | 1.0 | 1.0 | 55.6 | Tan | 15.2 | 0.295 | 9.2 | |
| F | 1.5 | 1.5 | 83.3 | Tan | 10.2 | 0.165 | 5.2 | |
| G | 2.0 | 2.0 | 111 | Lt. Tan | 8.2 | 0.12 | 3.8 | |
| H | 3.0 | 3.0 | 167 | Grey 8.0 | 0.155 | 4.8 | | |

*2.8 ml (rather than 2.1 ml) of concentrateed $H_2SO_4$ was added

The data show that as more water is added, the total amount of combined sulfur drops. In addition, as more water is added, the sulfur that is combining becomes more the sulfate rather than the sulfonate. The sulfur values are lower than the titration values since the sulfate group hydrolyzes off during titration to give a dibasic sulfuric acid rather than a monobasic sulfonic acid.

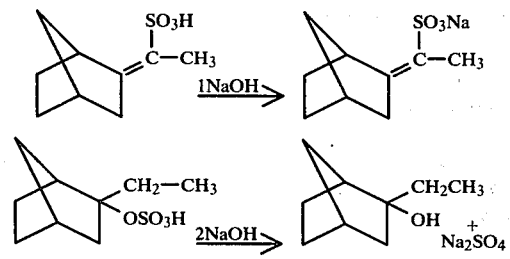

When about 1% water and more is present, it appears that all of the combined sulfur is in the sulfate form, i.e. there is very little or no sulfonate.

These examples clearly show that relatively low levels of water produce totally undesirable products, i.e., products which are hardly sulfonated and contain a substantial amount of unstable sulfate groups.

Control:

100 g of 20 Mooney V-2504-20 of Example 1 in 1000 ml hexane sulfonated at 25° C. with 60.75 mmoles of acetic anhydride and 37.5 mmoles $H_2SO_4$, quenched with 150 ml isopropanol, and stabilized with 0.5 g of Antioxidant 2246.

Water Addition:

The desired amount of water was pipetted in, and the cement was stirred for one hour. The sulfonation was then effected as described above.

Sample Workup:

Samples of the cement were steam stripped, washed in a Waring blender with water, and dewatered on a rubber mill. Samples were titrated and sulfur contents were determined.

EXAMPLE 6

In this Example, 21 separate runs were made to determine the effects of water on the sulfonation and the effects of adding excess acetic anhydride on sulfonation. These runs and the results therefrom are detailed in Table IV. In 1000 ml of Exxon hexane was dissolved 100 g of Vistalon 2504-20 polymer of Example 1. The desired amount of water (if any) was added and the cement was stirred for about 30 minutes and the desired amount of acetic anhydride (listed in Table III) was added. Concentrated sulfuric acid (37.5 mmoles $H_2SO_4$) was dripped in at room temperature, and the mixture was stirred for 30 minutes at room temperature. Reaction was terminated by the addition of 150 ml isopropanol, and 0.5 g of Antioxidant 2246 was added. The sulfonated polymer was isolated by steam stripping, washing with water in a Waring blender, and dewatering and drying on a warm rubber mill. Samples were dissolved (5 g/100 ml) in 95 toluene/5 methanol and titrated with 0.1 N ethanolic NaOH to an Alizarin-thymolphthalein end-point. The samples were also analyzed for sulfur. Run B in this sample is considered to be the control.

It is seen that about an 88% conversion of sulfonating agent was obtained. In Run A where the acetic anhydride was reduced somewhat a reduced conversion (80%) of sulfonating agent to sulfonate was obtained. This was attributed to still some remaining moisture in the starting polymer. In Runs, C, D and E, the acetic anhydride level was increased from that of the control, but the conversion to sulfonate remained substantially unchanged.

In Runs, F, J, N and R, 0.5, 1.0, 2.0 and 3.0 wt.% water was added deliberately to the cement prior to sulfonation with the amount of acetic anhydride used in control run. A dramatic reduction in sulfur content resulted just as described in Example 5.

In the remaining runs, acetic anhydride was added to those systems to which had been added water. The amount of acetic anhydride added was equal to and in excess of the amount of water that had been added. The results in Table IV show that the excess acetic anhydride improves sulfonation, and conversion of sulfonating agent to combined sulfur is again at least as good as that of the control. In Runs G, K, O and S, an amount of acetic anhydride equal to the added water was added. Conversion of sulfonating agent to sulfonate were 89%, 92%, 96% and 91%, respectively. The addition of 25 mmoles and 50 mmoles acetic anhydride in excess of the added water gave essentially identical results.

Thus, this example shows that water is effectively compensated for through the addition of at least an equivalent amount of acetic anhydride.

TABLE IV

| Run | A | B | C | D | E | F | G | H | I | J | K |
|---|---|---|---|---|---|---|---|---|---|---|---|
| Water added, ml | 0 | 0 | 0 | 0 | 0 | 0.5 | 0.5 | 0.5 | 0.5 | 1.0 | 1.0 |
| Mmoles | 0 | 0 | 0 | 0 | 0 | 27.8 | 27.8 | 27.8 | 27.8 | 55.5 | 55.5 |
| Acetic Anhydride, ml | 4.43 | 5.70 | 7.09 | 9.45 | 11.82 | 5.70 | 8.32 | 10.69 | 13.05 | 5.70 | 10.95 |
| Weight, g | 4.79 | 6.15 | 7.66 | 10.21 | 12.76 | 6.15 | 8.99 | 11.54 | 14.09 | 6.15 | 11.82 |
| Mmoles | 47 | 60 | 75 | 100 | 125 | 60 | 88 | 113 | 138 | 60 | 116 |
| $(CH_3CO)_2O/H_2SO_4$ | 1.25 | 1.6 | 2.0 | 2.67 | 3.33 | 1.6 | 2.35 | 3.01 | 3.68 | 1.6 | 3.09 |
| Sulfonate Content, meq./100g | | | | | | | | | | | |
| By Titration | 29.6 | 28.1 | 28.8 | 30.4 | 31.6 | 15.4 | 27.8 | 33.4 | 30.0 | 15.6 | 28.6 |
| By Sulfur Analysis | 29.3 | 32.0 | 33.0 | 33.0 | 32.3 | 18.6 | 32.5 | 34.7 | 33.4 | 8.3 | 33.6 |
| $H_2SO_4$ Conversion, % | 80 | 88 | 90 | 90 | 88 | 50 | 89 | 95 | 92 | 22 | 92 |
| Run | L | M | N | O | P | Q | R | S | T | U | |
| Water Added, ml | 1.0 | 1.0 | 2.0 | 2.0 | 2.0 | 2.0 | 3.0 | 3.0 | 3.0 | 3.0 | |
| Mmoles | 55.5 | 55.5 | 111 | 111 | 111 | 111 | 167 | 167 | 167 | 167 | |
| Acetic Anhydride, ml | 13.30 | 15.66 | 5.70 | 16.19 | 18.55 | 20.91 | 5.70 | 21.4 | 23.80 | 26.62 | |
| Weight, g | 14.37 | 16.92 | 6.15 | 17.48 | 20.03 | 22.59 | 6.15 | 23.15 | 25.70 | 28.25 | |
| Mmoles | 141 | 166 | 70 | 171 | 196 | 221 | 60 | 227 | 252 | 277 | |
| $(CH_3CO)_2O/H_2SO_4$ | 3.76 | 4.43 | 1.6 | 4.56 | 5.23 | 5.89 | 1.6 | 7.05 | 6.72 | 7.39 | |
| Sulfonate Content, meq./100g | | | | | | | | | | | |
| By Titration | 32.4 | 32.0 | 16.0 | 31.0 | 33.2 | 29.4 | 13.6 | 28.4 | 33.0 | 32.4 | |
| By Sulfur Analysis | 33.6 | 33.1 | 6.7 | 35.0 | 34.1 | 32.8 | 5.8 | 33.1 | 33.6 | 33.9 | |

| TABLE IV-continued | | | | | | | | | | |
|---|---|---|---|---|---|---|---|---|---|---|
| H₂SO₄ Conversion, % | 92 | 91 | 18 | 96 | 93 | 90 | 16 | 91 | 92 | 93 |

EXAMPLE 7

Twenty-one separate runs were made to determine the effects of water on the sulfonation of EPDM with acetyl sulfate derived from concentrated sulfuric acid and acetyl chloride and the effects of the addition of excess acetyl chloride on the sulfonation of wet cement. These runs and the results therefrom are detailed in Table V.

In 100 ml of Exxon hexane was dissolved 100 g of a 20 Mooney EPDM of the same description as that used in Example 1. The desired amount of water (if any) was added followed by the desired amount of acetyl chloride (listed in Table V). Concentration sulfuric acid (2.10 ml, 37.5 mmoles) was dripped in at room temperature, and the mixture was stirred for 30 minutes at room temperature. Reaction was terminated with 100 ml methanol and 0.5 g of Antioxidant 2246 was added. The polymers were worked up and analyzed as described in Example 4. Run B is considered to be the control where an 80% conversion of sulfuric acid to sulfonate was obtained. In Run A where the acetyl chloride was reduced somewhat a reduced conversion (74%) was obtained. This again was attributed to some still remaining moisture in the starting polymer. In Runs C, D and E, the acetyl chloride was increased over that of the control. Conversion of sulfuric acid increased even further in Run C but thereafter remained unchanged with increasing acetyl chloride concentration.

The titration values were higher than those obtained by sulfur analysis. This is believed due to the retention of some water-insoluble acetyl chloride, but no more than about 5 mmoles. Each mole of acetyl chloride consumes two moles of NaOH during titration.

In Runs F, J, N and R, 0.5, 1.0, 2.0 and 3.0 ml of water was added deliberately to the cement prior to sulfonation with the amount of acetyl chloride used in Control Run B. A dramatic reduction in sulfur content resulted just as described in Examples 5 and 6.

In the remaining runs, acetyl chloride was added to those systems to which had been added water. The amount of acetyl chloride added was equal to and in excess of the amount of water that had been added. The results in Table V show that excess acetyl chloride improves sulfonation and conversion of sulfonating agent (derived from H₂SO₄) to sulfonate is again at least as good as that of the control. In Runs G, I, O and S, an amount of acetyl chloride equal to the amount of added water was added. Conversions of sulfuric acid to sulfonate were 93%, 90%, 83% and 84%. The addition of 25 mmoles and 50 mmoles acetyl chloride in excess of the added water gave identical results.

EXAMPLE 8

In 1000 ml of Exxon hexane was dissolved 100 g of a 20 Mooney EPDM of the same description as that used in Example 1. Two such cements were prepared.

Into one cement at room temperature was dripped in 2.48 ml (37.5 mmoles) of chlorosulfonic acid. Gel formation was immediate, and at the end of the chlorosulfonic addition a gelled mass had wrapped around the stirrer.

Into the second cement at room temperature was first charged 3.52 ml (37.5 mmoles) of acetic anhydride. Then 2.48 ml chlorosulfonic acid was dripped in. The results were identical to that encountered with the first cement in the absence of acetic anhydride.

These examples show that chlorosulfonic acid is much too reactive in the sulfonation of unsaturated polymers. In addition, its rate of reaction with acetic anhydride to produce the mild acetyl sulfate sulfonating reagent is slower than its rate of reaction with unsaturated polymer.

EXAMPLE 9

Acetyl sulfate sulfonating agent was generated from chlorosulfonic acid as follows: 31.0 ml (0.33 mole) of acetic anhydride was cooled to below 0° C. Chlorosulfonic acid (19.9 ml, 0.30 mole) was added slowly. After all the chlorosulfonic acid was added, the thick homo-

TABLE V

| Run | A | B | C | D | E | F | G | H | I | J | K |
|---|---|---|---|---|---|---|---|---|---|---|---|
| Water Added, ml | 0 | 0 | 0 | 0 | 0 | 0.5 | 0.5 | 0.5 | 0.5 | 1.0 | 1.0 |
| Mmoles | — | — | — | — | — | 27.8 | 27.8 | 27.8 | 27.8 | 55.5 | 55.5 |
| Acetyl Chloride, ml | 2.84 | 4.26 | 5.33 | 7.10 | 8.88 | 4.26 | 6.25 | 8.03 | 9.80 | 4.26 | 8.24 |
| Weight, g | 3.14 | 4.71 | 5.89 | 7.85 | 9.81 | 4.71 | 6.91 | 8.87 | 10.8 | 4.71 | 9.11 |
| Mmoles | 47 | 60 | 75 | 100 | 125 | 60 | 88 | 113 | 138 | 60 | 116 |
| $CH_3COCl/H_2SO_4$ | 1.25 | 1.6 | 2.0 | 2.67 | 3.33 | 1.6 | 2.35 | 3.01 | 3.68 | 1.6 | 3.09 |
| Sulfonate Content | | | | | | | | | | | |
| Titration, meq/100g | 34.6 | 41.4 | 26.0 | 39.8 | 47.2 | 36.6 | 50.6 | 48.8 | 47.4 | 12.2 | 40.6 |
| Wt. % Sulfur | 0.865 | 1.035 | 1.10 | 1.07 | 1.105 | 0.735 | 1.085 | 1.055 | 1.015 | 0.11 | 1.045 |
| Sulfonate Content meq/100g | 27.0 | 32.3 | 34.4 | 33.4 | 34.5 | 23.0 | 33.9 | 33.0 | 31.7 | 3.4 | 32.7 |
| $H_2SO_4$ Conversion, % | 74 | 88 | 94 | 92 | 95 | 62 | 93 | 90 | 85 | 9 | 90 |

| Run | L | M | N | O | P | Q | | S | T | U | |
|---|---|---|---|---|---|---|---|---|---|---|---|
| Water Added, ml | 1.0 | 1.0 | 2.0 | 2.0 | 2.0 | 2.0 | 3.0 | 3.0 | 3.0 | 3.0 | |
| Mmoles | 55.5 | 55.5 | 111 | 111 | 111 | 111 | 167 | 167 | 167 | 167 | |
| Acetyl Chloride, ml | 10.02 | 11.79 | 4.26 | 12.14 | 13.92 | 15.70 | 4.26 | 16.13 | 17.90 | 19.68 | |
| Weight, g | 11.07 | 13.03 | 4.71 | 13.42 | 15.39 | 17.35 | 4.71 | 17.82 | 19.78 | 21.74 | |
| Mmoles | 141 | 166 | 60 | 171 | 196 | 221 | 60 | 227 | 252 | 277 | |
| $CH_3COCl/H_2SO_4$ | 3.76 | 4.43 | 1.6 | 4.56 | 5.23 | 5.89 | 1.6 | 6.05 | 6.72 | 7.39 | |
| Sulfonate Content | | | | | | | | | | | |
| Titration, meq/100g | 41.8 | 41.4 | 4.8 | 42.8 | 45.6 | 40.2 | 4.0 | 38.6 | 44.2 | 48.6 | |
| Wt. % | Sulfur | 1.015 | 1.025 | 0.085 | 0.975 | 1.035 | 1.01 | 0.065 | 0.98 | 0.92 | 0.99 |
| Sulfonate Content meq/100g | 31.7 | 32.0 | 2.7 | 30.5 | 32.3 | 31.6 | 2.0 | 30.6 | 28.8 | 30.9 | |
| $H_2SO_4$ Conversion, % | 87 | 88 | 7 | 83 | 88 | 86 | 5 | 84 | 79 | 84 | | geneous reagent was permitted to warm to 10° C. The reagent was 5.90 Molar in acetyl sulfate.

A 20 Mooney hexane cement was prepared as described in Example VIII. To the cement was added at room temperature 6.34 ml of the 5.90 Molar acetyl sulfate (37.5 mmoles) described above. No gel formed and a homogeneous sulfonation cement was obtained. After 30 minutes, the sulfonation cement was inactivated with 150 ml of isopropanol. The unneutralized sulfonated polymer was isolated and dried as described in Example 6.

Titration showed the sulfonated polymer to contain 31.2 meq. of sulfonate groups. Dietert sulfur analysis showed the polymer to contain 0.85 weight percent sulfur which is equivalent to 26.3 meq. sulfonate per 100 g of sulfonated polymer.

EXAMPLE 10

Nineteen separate runs were made to determine the effects of water on the sulfonation of EPDM with the preformed acetyl sulfate derived from chlorosulfonic acid and acetic anhydride and the effects of the addition of acetic anhydride and acetyl chloride on the sulfonation of the wet cement. These runs and the results therefrom are detailed in Table VI.

nol, and the unneutralized sulfonated polymer was worked up and dried as described in Example 6.

The control (Run A) gave a very high reagent conversion (97%). A possible reason for the very high conversion is that the sulfonating agent contains acetyl chloride and some acetic anhydride from the generation of the reagent from acetic anhydride and chlorosulfonic acid, and so water effects are negligible. When additional acetic anhydride (Runs B,D,D) or acetyl chloride (Runs E,F,G) was added to the cement sulfonating agent conversions remained high. When 0.5 ml of water was added (Run H) reagent conversion remained high (77%) which is due primarily to the acetyl chloride present as a result of reagent generation. However, when 1.0, 2.0 and 3.0 ml of water was added (Runs I, J, K) reagent conversion dropped to 20% and below.

In the remaining runs, acetic anhydride (Runs, L, M, N, O) and acetyl chloride (Runs P, Q, R, S) were added to the cements containing water. In general, reagent conversions were increased to above 70%, although Run L (61%) and Run S (19%) gave lower than expected conversions.

Since many modifications and variations of this invention may be made without departing from the spirit or scope of the invention thereof, it is not intended to

TABLE VI

| Run | A | B | C | D | E | F | G | H | I | J |
|---|---|---|---|---|---|---|---|---|---|---|
| Water Added, ml | 0 | 0 | 0 | 0 | 0 | 0 | 0 | 0.5 | 1.0 | 2.0 |
| Mmoles | 0 | 0 | 0 | 0 | 0 | 0 | 0 | 27.8 | 55.5 | 111 |
| $(CH_3C)_2O$, ml $\parallel$ O | — | 1.76 | 3.52 | 7.05 | — | — | — | — | — | — |
| Weight, E | — | 1.91 | 3.83 | 7.66 | — | — | — | — | — | — |
| Mmoles | — | 18.75 | 37.5 | 75.00 | — | — | — | — | — | — |
| $CH_3COCl$, ml | — | — | — | — | 1.33 | 2.66 | 5.33 | — | — | — |
| Weight, g | — | — | — | — | 1.47 | 2.94 | 5.89 | — | — | — |
| Mmoles | — | — | — | — | 18.75 | 37.5 | 75.00 | — | — | — |
| Sulfonate Content Titration, meq/100g | 43.4 | 34.0 | 33.8 | 39.2 | 34.4 | 32.2 | 33.2 | 32.0 | 9.8 | 8.4 |
| Wt. % Sulfur | 1.135 | 0.925 | 0.915 | 1.05 | 0.885 | 0.905 | 0.85 | 0.90 | 0.24 | 0.15 |
| meq, 100g | 35.5 | 28.9 | 28.6 | 32.8 | 27.7 | 28.3 | 26.6 | 28.1 | 7.5 | 4.7 |
| Sulfonate Content Conversion of Acetyl Sulfate, % | 97 | 79 | 78 | 90 | 76 | 77 | 72 | 77 | 20 | 13 |

| Run | K | L | M | N | O | P | Q | R | S |
|---|---|---|---|---|---|---|---|---|---|
| Water Added, ml | 3.0 | 0.5 | 1.0 | 2.0 | 3.0 | 0.5 | 1.0 | 2.0 | 3.0 |
| Mmoles | 167 | 27.8 | 55.5 | 111 | 167 | 27.8 | 55.5 | 111 | 167 |
| $(CH_3C)_2O$, ml $\parallel$ O | — | 2.82 | 5.64 | 11.23 | 16.91 | — | — | — | — |
| Weight, g | — | 3.06 | 6.13 | 12.25 | 18.38 | — | — | — | — |
| Mmoles | — | 30 | 60 | 120 | 180 | — | — | — | — |
| $CH_3COCl$, ml | — | — | — | — | — | 2.13 | 4.26 | 6.39 | 8.52 |
| Weight, g | — | — | — | — | — | 2.36 | 4.71 | 7.07 | 9.42 |
| Mmoles | — | — | — | — | — | 30 | 60 | 90 | 120 |
| Sulfonate Content Titration, meq/100g | 8.2 | 23.6 | 32.0 | 36.4 | 32.2 | 36.6 | 33.8 | 34.2 | 21.6 |
| Wt. %, Sulfur | 0.165 | 0.72 | 0.875 | 0.985 | 0.89 | 0.845 | 0.875 | 0.815 | 0.22 |
| meq, 100g | 5.2 | 22.5 | 27.3 | 30.8 | 27.8 | 26.4 | 27.3 | 25.5 | 6.9 |
| Sulfonate Content Conversion of Acetyl Sulfate % | 14 | 61 | 74 | 84 | 76 | 72 | 74 | 69 | 19 |

In 1000 ml of Exxon hexane was dissolved 100 g of a 20 Mooney EPDM used in Examples 8 and 9. The desired amount of water (if any) was added. Then the desired amount of acetic anhydride (if any) or acetyl chloride (if any) was added. To the cement was added 6.34 ml of 5.90 Molar acetyl sulfate (37.5 mmoles) derived from chlorosulfonic acid and acetic anhydride as described in Example 9. After 30 minutes the sulfonation cement was inactivated with 150 ml of isopropalimit the spirit or scope thereof to the specific examples thereof.

What is claimed is:

1. A process for sulfonating an unsaturated polymer to form a sulfonated polymer, which comprises the steps of:
    (a) forming a cement of said unsaturated polymer in a non-reactive solvent; and
    (b) contacting said cement with a sulfonating agent at a temperature of about −100° C. to about +100°

C. for a sufficient period of time to form a sulfonated polymer having about 15 to about 50 meq. of sulfonate groups per 100 grams of said sulfonated polymer, said sulfonating agent being a mixture of $RCO_2SO_3H$ and a second reagent which is selected from the group consisting of $(RCO)_2O$ and $RCO_X$, a molar ratio of said second reagent to said $RCO_2SO_3H$ being at least about one, wherein R is selected from the group consisting of $CH_3-$, $C_2H_5-$, $C_3H_7-$, $C_4H_9-$, $C_5H_{11}-$, $C_6H_{13}-$, and $C_6H_5CH_2$ and mixtures thereof, and X is selected from the group consisting of F, Cl and Br.

2. The process of claim 1, wherein such sulfonating agent is formed prior to addition to said cement.

3. The process of claim 1, wherein said sulfonating agent is formed in situ in said cement.

4. The process of claim 1, wherein such sulfonating agent is formed from a mixture of said $(RCO)_2O$ and concentrated $H_2SO_4$.

5. The process of claim 1, wherein said sulfonating agent is formed from a mixture of said $(RCO)_2O$, RCOCl and $H_2SO_4$.

6. The process of claim 1, wherein said sulfonating agent is formed from a mixture of said $(RCO)_2O$ and $ClSO_3H$.

7. The process of claim 1, wherein such sulfonating agent is formed from a mixture of RCOCl and $H_2SO_4$.

8. The process according to claim 1, wherein said cement contains at least about 0.1 wt. % of water.

9. The process according to claim 1, wherein said elastomeric polymer is neoprene.

10. The process according to claim 1, wherein said elastomeric polymer is selected from the group consisting of Butyl rubbers, styrene-butadiene copolymers, isoprene-styrene copolymers, and EPDM terpolymers.

11. The process according to claim 1, wherein said sulfonated elastomeric polymer has about 20 to about 40 meq. sulfonate groups per 100 grams of said sulfonated elastomeric polymer.

12. The process according to claim 1, further including neutralizing at least about 95% of said sulfonate groups with a metal counterion selected from the group consisting of antimony, iron, lead and Groups I-A, II-A, I-B and II-B of the Periodic Table of Elements and mixtures thereof.

13. The process according to claim 12, further including adding an ionic plasticizer at a concentration level of at least about 3 parts by weight per 100 parts by weight of said neutralized sulfonated elastomeric polymer.

14. The process according to claim 13 further including an additive to said neutralized sulfonated elastomeric polymer at a concentration level of less than about 300 parts by weight per 100 parts by weight of said neutralized sulfonated elastomeric polymer.

15. The process according to claim 14, wherein said additive is selected from the group consisting of oils, fillers, waxes, pigments, a metallic hydroxide and stabilizers and mixtures thereof.

16. The process according to claim 1, wherein said non-reactive solvent is selected from the group consisting of aliphatic hydrocarbons, chlorinated aliphatics, aromatic hydrocarbons, and chlorinated aromatic hydrocarbons and mixtures thereof.

17. The process of claim 1 wherein at least 70% of the amount of sulfonating agent present in the reaction zone that does not exceed the stoichiometric amount of sulfonating agent required to react with all available sites of unsaturation in said elastomeric polymer is converted to sulfonate groups on said elastomeric polymer.

18. The process of claim 1, wherein said elastomeric polymer dissolved in such non-reactive solvent contains at least 0.2 wt. % water.

* * * * *